July 2, 1963 H. J. BUTLER 3,095,949
IMPROVEMENTS IN DISC BRAKES
Filed March 24, 1960 5 Sheets-Sheet 1
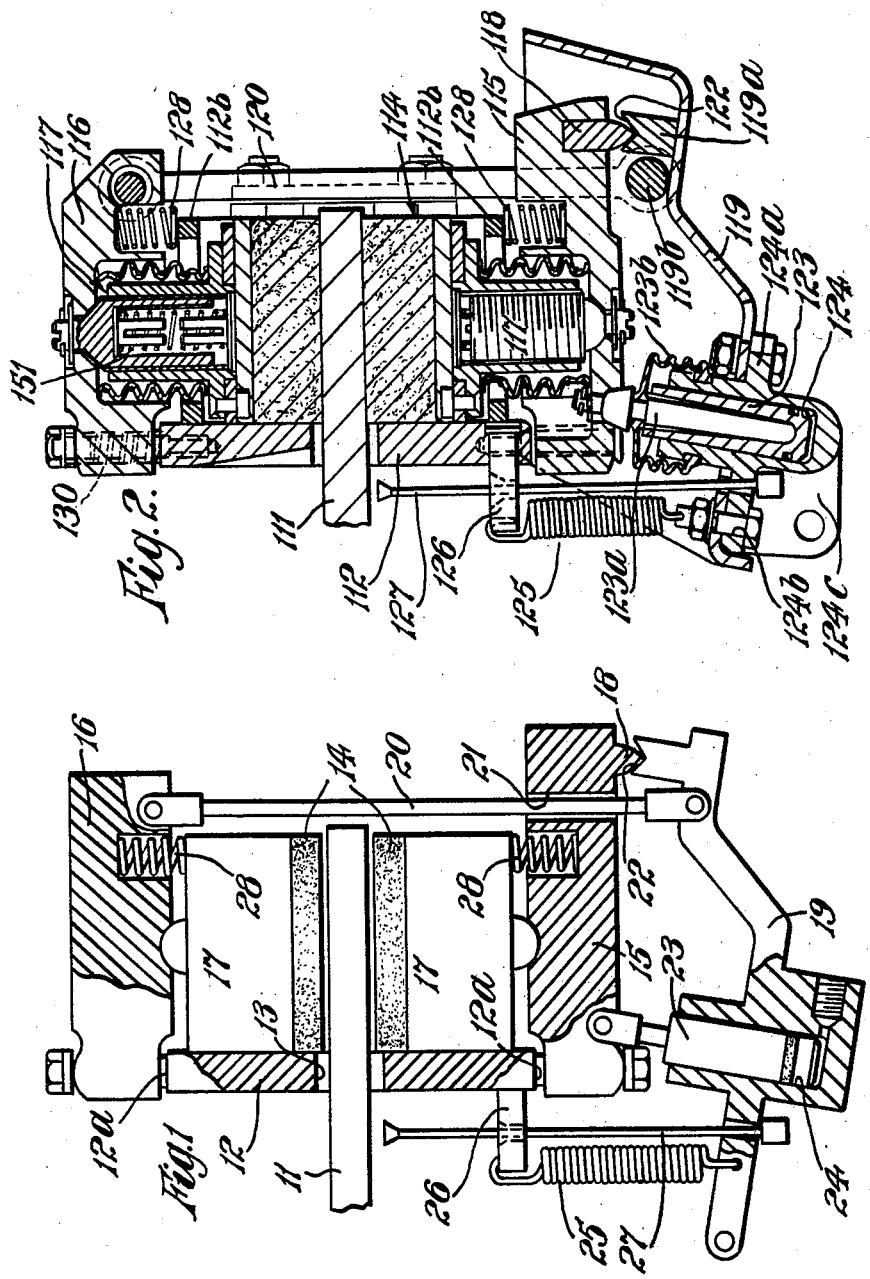
INVENTOR
Henry James Butler
by Benj. T. Rauber
his attorney

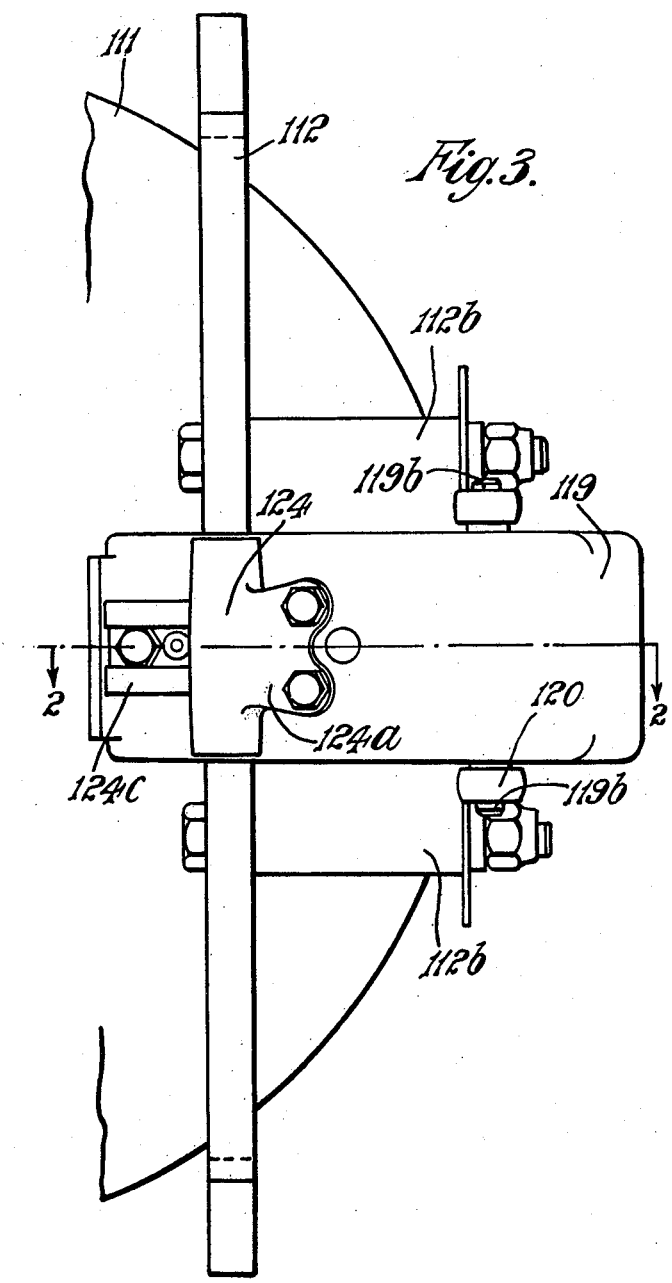

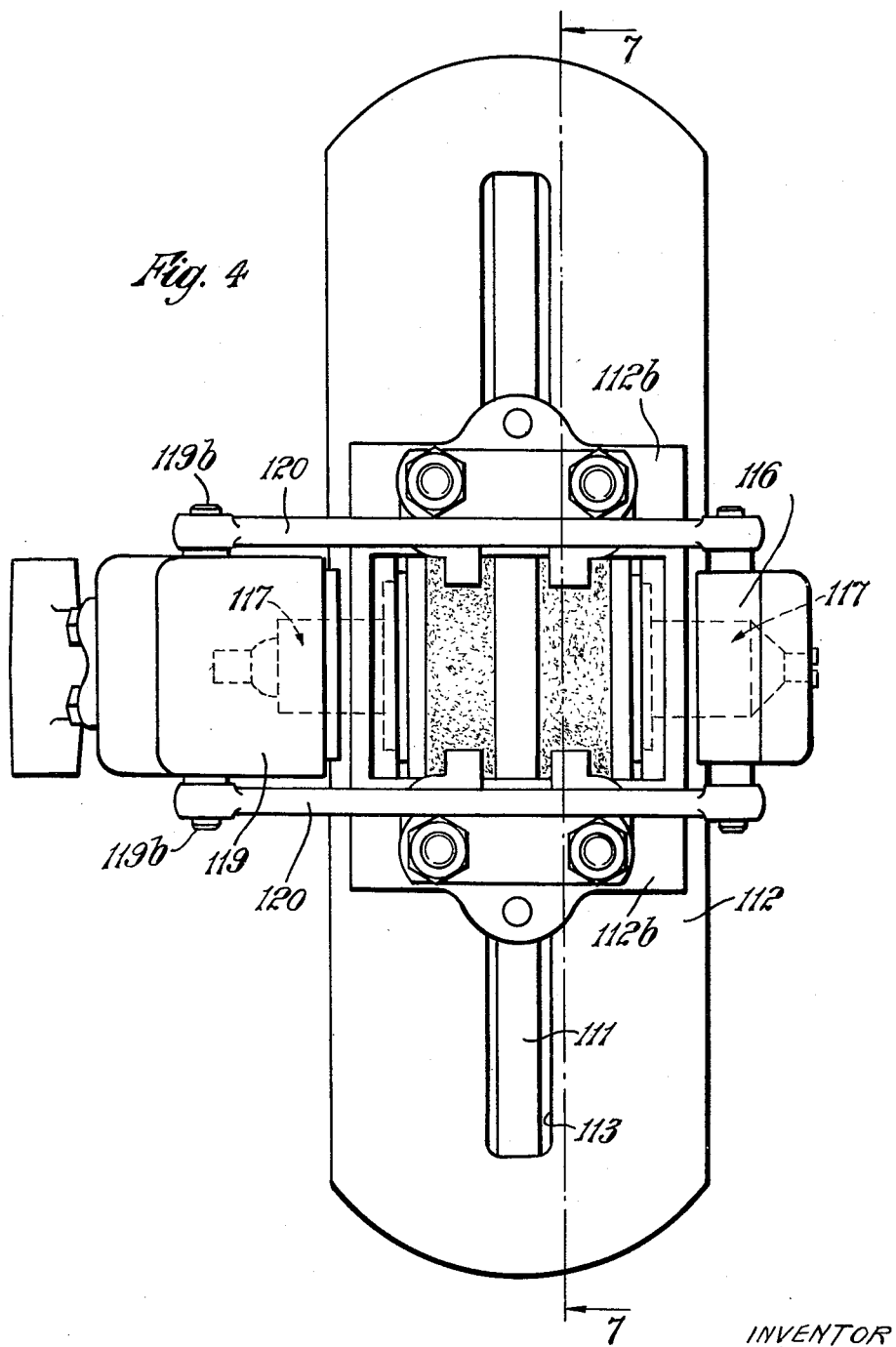

July 2, 1963　　　　H. J. BUTLER　　　　3,095,949
IMPROVEMENTS IN DISC BRAKES
Filed March 24, 1960　　　　　　　　　　　　　5 Sheets-Sheet 4
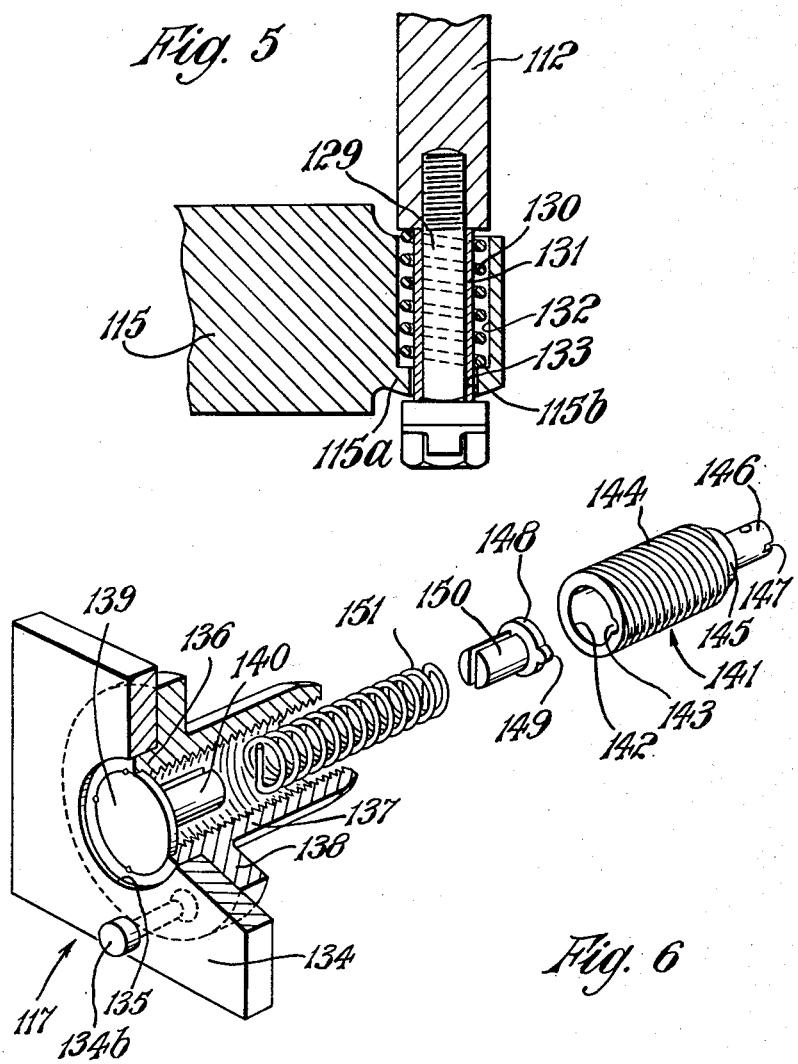
INVENTOR
Henry James Butler
by Benj. T. Rauber
his attorney

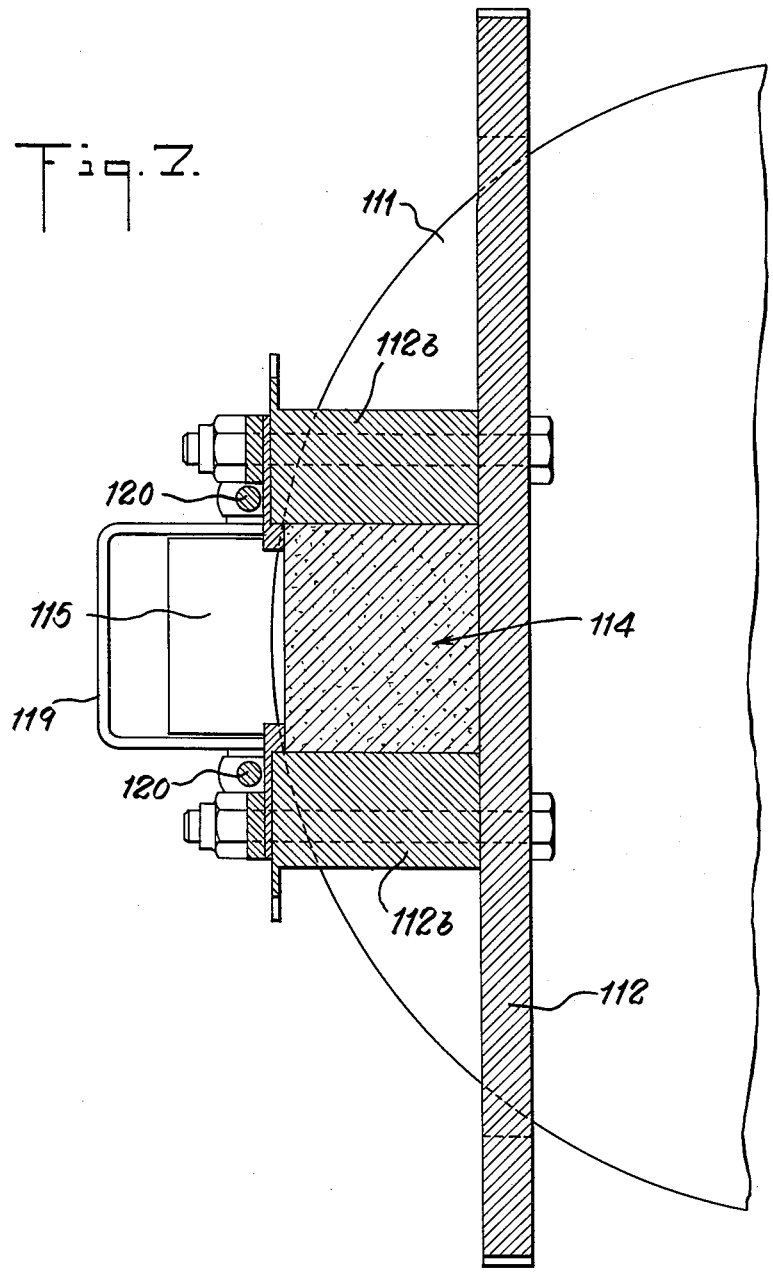

United States Patent Office 3,095,949
Patented July 2, 1963

3,095,949
IMPROVEMENTS IN DISC BRAKES
Henry James Butler, Sutton Coldfield, England, assignor to Dunlop Rubber Company Limited, a British company
Filed Mar. 24, 1960, Ser. No. 17,377
Claims priority, application Great Britain Apr. 21, 1959
2 Claims. (Cl. 188—73)

This invention provides a disc brake comprising a rotatable braking disc, a non-rotatable slotted base plate completely encircling the disc on a chord thereof, axially opposed friction pad assemblies situated on opposite sides of the disc, guides for said assemblies which are rigidly anchored to or integral with the base plate and means for imparting axial sliding movement to the assemblies along the guides to bring them into braking engagement with the disc. Preferably the disc brake includes behind each assembly a pressure plate pivoted to the base plate, an operating lever fulcrummed to one of the pressure plates, and a link situated beyond the periphery of the disc connecting the lever to the other pressure plate, angular movement of the operating lever being effective to move both pressure plates towards the disc and thereby force the friction pad assemblies into braking engagement with the disc. It conveniently includes a fluid pressure actuator connected between the operating lever and the adjacent pressure plate for applying angular brake applying movement to the operating lever.

One embodiment of disc brake according to the invention will now be described in more detail, by way of example, with reference to the accompanying drawings, in which:

FIGURE 1 is a diagram illustrating the operation of the brake,

FIGURE 2 is a section through a brake embodying the invention taken on line A—A of FIGURE 3, FIGURES 3 and 4 are respectively an elevation and a plan view of the brake, taken from the right of FIGURE 3, FIGURE 5 is a detail sectional view showing the pivot connection of the pressure plates, and FIGURE 6 is an exploded sectioned perspective view showing the wear-compensating thrust assembly, FIGURE 7 is a sectional view through a brake embodying the invention taken on line 7—7 of FIGURE 4.

The description will begin with the operation of the disc brake, with reference to the diagrammatic FIGURE 1 only, and will subsequently identify the parts of FIGURES 2, 3 and 4 with those of FIGURE 1 by prefixing the numerals of FIGURE 1 by a 1 to make a three figure numeral. A description of the parts of FIGURES 5 and 6 will follow together with their operation.

The brake shown in FIGURE 1 comprises a rotatable disc 11, and an oblong base plate 12 having a longitudinal slot 13 of sufficient width and length to enable the plate 12 to be fitted chordally over the disc 11 and secured to a convenient non-rotatable member, with sufficient clearance for the disc 11 to rotate without fouling the edges of the slot 13.

Friction pads 14 disposed on opposite sides of the disc and mounted on backing plates 17 are guided for axial movement towards and away from the disc 11. Pressure plates 15 and 16, mounted pivotally on the outer long sides 12a of the base plate 12, are operable as described below to urge the friction pads 14 towards the disc 11.

The pressure plate 15 is provided near its outer edge and on the side remote from the disc with a triangular ridge 18, which extends in a direction parallel to the long sides of the plate 12. A lever 19 is fulcrummed on the ridge 18 on the pressure plate 15, and connected to the other pressure plate 16 by tie rods 20 extending through holes 21 in the pressure plate 15.

The lever 19 has a V-shaped channel 22 formed in one end to co-act with the ridge 18 to provide a fulcrum for the lever 19. The brake is applied by admitting fluid under pressure to a cylinder 24 formed in the lever 19 and containing a piston 23 pivoted to the pressure plate 15. This causes the pressure plate 15 to be moved towards the disc 11 by the lever 19 and the tie rods 20 to move the opposite pressure plate 16 also towards the disc 11. Alternatively or additionally the braking effort may be applied by exerting mechanical force on the end of the lever 19 remote from the fulcrum 18/22. The brake is provided with a tension return spring 25 which is connected between the lever 19 and a flange 26 on the plate 12. A lever stop, constituted by a rod 27, having enlarged ends and passing through holes in the lever 12 and the flange 26, which are too small to allow passage of the heads, prevents the lever 19 moving outwards so far that the piston 23 would leave the cylinder 24.

Centralizing springs 28 are provided between the pressure plates 15 and 16 and the associated backing plates 17, the purpose of these springs being to prevent unilateral action of wear-compensating mechanism associated with the backing plates.

A retraction device, described later, serves to return the friction pads 14 a preselected distance from the disc 11 after every application of the brake. Only a very small pivotal movement of the pressure plates is required at each brake application.

The brake shown in FIGURES 2–6 will now be described. The disc 111, backing plate 112, friction elements 114, pressure plates 115 and 116, backing plates provided with wear compensating devices 117, tie rods 120, piston 123, cylinder 124, tension return spring 125, lever stop rod 127 and centralising springs 128 are all as described with reference to FIGURE 1. The friction elements 114 are guided in their movement to and from the disc 111 by a guiding and stress supporting structure which comprises a pair of guide elements 112b rigidly secured to the backing plate 112 on each side of the disc and having a recess for the disc. The guide elements are spaced to form a passage transverse to the plane of the disc in which the friction pads are guided in their movement to and from the disc and also serves to receive and support the torsion stresses imparted to the friction elements when braking a rotating disc. The outer ends of the elements may be connected by cross rods or beams, which may be integral with the elements 112b as indicated in FIGURE 4.

The plain lever 19 of FIGURE 1 is replaced in FIGURES 2–4 by a stiff shell lever 119 which presents the open part of the shell towards the disc 111. The lever 119 has an internal projection 119a with a groove 122 therein engaging the ridge 118 of the adjacent pressure plate 115. The tie rods 120 are secured to the lever 119 by pins 119b. The cylinder 124 is provided with a flange 124a with holes 124b for securing the cylinder 124 to the lever 119 and with a pair of lugs 124c, for the purpose of attaching a mechanical linkage to effect manual operation of the brake.

The piston 123 has a tapering blind bore with a rounded end which receives a cylindrical piston rod 123a with a rounded nose engaging the rounded end of the bore. The opposite end of the piston rod 123a is pivoted to the pressure plate 115 near the line about which the plate 115 pivots. A dirt-excluding rubber boot 123b engages recesses in the piston rod 123a and in the outside of the cylinder 124.

The return spring 125 is attached to one of the securing bolts of the cylinder flange 124a and to a flange 126 secured to the base plate 112. The lever stop rod 127 threads the lever 119 and cylinder flange 124e at one end and the flange 126 at the other.

An enlarged detail of the pivotal mounting of the pressure plates 115 and 116 is shown in FIGURE 5. As shown a bolt 129 is introduced through the pressure plate 115 or 116, a coiled helical spring 130 and a tubular distance piece 31 is engaged in a threaded hole in the plate 112. The pressure plate 115 is formed with a narrow projection 115a at its pivot end, the outer face 115b of the projection 115a being rounded or chamfered. A bore of two diameters is formed in the projection 115a, the large diameter portion 132 extending over the greater part of the bore. The lesser bore 133 loosely embraces the distance piece 131 and the spring 130 fits loosely into the larger portion 132 of the bore and is compressed between the step in the bore and the side of the plate 112 thus urging the pressure plate 115 away from the plate 112. The bolt 129 retains this assembly in place. Limited angular movement of the pressure plate 115 is allowed by virtue of the loose fitting of the distance piece 131 and helical spring 130 in the bore and by the greater length of the distance piece 131 over the thickness of the projection 115a.

Inward force from the pressure plates 15, 16 is transmitted to the friction pads 14 by the wear compensation device 117 shown in FIGURE 6. A backing plate 134, to which the friction pad is fitted and located by a peg 134b, has a central hole 135 accommodating the spigot 136 of an internally threaded tubular member 137, provided with a thrust flange 138 which bears on the reverse face of the plate 134. A flat disc 139 secured to the spigot 136 closes its open end. A dowel 140 having a central recess is secured to the flat disc 139.

A cylinder 141 has a blind bore 142 with an axial keyway 143 cut along its inside surface. A six start thread 144 is formed on the outer periphery of the cylinder 141, which is formed with a rounded portion 145 which, when the parts are assembled, bears on a complementary seat on the pressure plate 115 or 116. A projection 146 from the rounded seating having a screw-driver slot 147 passes through the pressure plate. A circular plate 148 with a pip 149 is fitted into the bore 142 in the cylinder 141 with the pip 149 engaging the keyway 143. Secured to the circular plate 148 is a second dowel 150 having a central recess. A coiled helical spring 151 is mounted in compression between the dowels with its ends engaged in the recesses in the dowels.

When the cylinder 144 is screwed into the tubular member 137 the spring 151 is automatically torsioned ready for operation. The device 117, when positioned between the pressure plate 115 and the friction pad 114, is guided for axial movement by the guide members 112b. Rotation of the projection 146 serves to adjust the load of the spring 151.

Pad retractors (not shown) are used to retract the friction pads 114 through a predetermined distance to allow a running clearance. When the brakes are applied the pressure plate 115 or 116 presses on the associated cylinder 141 which then transmits the force through the threads 144 to the tubular member 137 and thence to the associated friction pad 114. The retractor is deformed elastically at first but as wear progresses the retractor takes on a permanent set though still retaining sufficient elasticity to retract the pads. As wear progresses the distance between the friction pad backing plate 134 and the distance plate 115 or 116 increases. This increase in distance is constantly taken up by the unwinding of the cylinder 141 under the action of the helical spring 151 so that the pressure plate does not, at any state of pad wear, have to pivot through a large angle to apply the brake.

Having now described my invention—what I claim is:

1. A disc brake comprising a rotatable disc, a non-rotatable structure comprising a pair of supporting elements one on each side of and spaced from a radial side of said disc and extending on a common chord of said disc to project beyond the periphery of said disc and united to each other beyond the said periphery to form a base plate, a pair of friction elements, one on each side of said disc, a guiding and stress supporting structure for said friction elements comprising a pair of guiding and stress supporting members rigidly fixed on both said supporting elements and extending from the side of said supporting elements remote from the axis of said disc to a distance beyond the periphery of said disc, the guiding and stress supporting members being spaced from each other to form a guide passage for each of said friction elements transverse to the plane of said disc and open to said disc in which said friction elements are retained and guided in movement to and from the braking surfaces of said disc and a pair of brake actuating means comprising a pressure plate pivoted to the base plate, an operating lever fulcrumed to one of the pressure plates, and a link situated beyond the periphery of the disc connecting the lever to the other pressure plate, angular movement of the operating lever being effective to move both pressure plates toward the disc and thereby force the friction elements into braking engagement with the disc, and a wear compensating device transmitting pressure from said pressure plate to said friction pad assembly to move said friction pad assembly against said disc and to withdraw said assembly upon movement in the reverse direction, said wear compensating device comprising a hollow, internally threaded, outer cylinder, an externally threaded inner cylinder threaded into said outer cylinder, one of said cylinders being rotatably connected to said pressure plate and the other cylinder being connected to the friction pad assembly, and a spring torsioned to rotate said inner cylinder outwardly of said outer cylinder when said pressure plate moves away from said friction pad assembly.

2. The disc brake of claim 1 in which said spring is a coil spring fastened at one end to said outer cylinder and extending within said outer cylinder to said inner cylinder and secured thereto.

References Cited in the file of this patent

UNITED STATES PATENTS

| | | |
|---|---|---|
| 2,375,152 | Turner | May 1, 1945 |
| 2,830,679 | Butler | Apr. 15, 1958 |
| 2,873,006 | Phillips | Feb. 10, 1959 |
| 2,966,964 | Brueder | Jan. 3, 1961 |

FOREIGN PATENTS

| | | |
|---|---|---|
| 1,147,435 | France | June 11, 1957 |
| 1,037,217 | Germany | Aug. 21, 1958 |
| 708,748 | Great Britain | May 12, 1954 |